United States Patent [19]

MacDonald et al.

[11] 4,399,502

[45] Aug. 16, 1983

[54] INSTRUMENT CONTROL SYSTEM

[75] Inventors: Scott N. MacDonald, Pleasant Hill; Haakon T. Magnussen, Jr., Pinole, both of Calif.

[73] Assignee: Altex Scientific Inc., Berkeley, Calif.

[21] Appl. No.: 235,805

[22] Filed: Feb. 19, 1981

[51] Int. Cl.³ .......................................... G06F 15/46
[52] U.S. Cl. ............................ 364/189; 340/825.06; 364/138; 364/579; 364/900
[58] Field of Search ............... 364/138, 139, 146, 171, 364/188, 189, 496, 497, 498, 499, 500, 200 MS File, 900 MS File, 579; 340/825.06, 825.07, 825.17, 825.22, 825.29

[56] References Cited

U.S. PATENT DOCUMENTS

| | | | |
|---|---|---|---|
| 3,518,628 | 6/1970 | Giel et al. | 340/167 |
| 3,597,741 | 8/1971 | Sieracki | 340/172.5 |
| 3,721,813 | 3/1973 | Condon et al. | 235/151.35 |
| 3,725,870 | 4/1973 | Felcheck et al. | 340/172.5 |
| 3,771,135 | 11/1973 | Huettner et al. | 340/172.5 |
| 3,863,220 | 1/1975 | Osawa et al. | 340/147 LP |
| 3,882,465 | 5/1975 | Cook et al. | 340/147 R |
| 3,971,000 | 7/1976 | Cromwell | 364/200 |
| 4,001,790 | 1/1977 | Barlow | 340/172.5 |
| 4,007,443 | 2/1977 | Bromberg et al. | 340/172.5 |
| 4,064,394 | 12/1977 | Allen | 364/189 |
| 4,086,568 | 4/1978 | Watts, Jr. et al. | 340/147 R |
| 4,086,569 | 4/1978 | Pitches et al. | 340/167 R |
| 4,104,976 | 8/1978 | Landau, Jr. et al. | 364/189 X |
| 4,107,784 | 8/1978 | Van Bemmelen | 364/900 |
| 4,165,532 | 8/1979 | Kendall et al. | 364/146 X |
| 4,166,483 | 9/1979 | Nordlund | 364/189 X |
| 4,173,754 | 11/1979 | Feiker | 340/310 R |
| 4,201,887 | 5/1980 | Burns | 179/2 DP |

*Primary Examiner*—Joseph F. Ruggiero
*Attorney, Agent, or Firm*—R. J. Steinmeyer; Robert R. Meads; Gary T. Hampson

[57] ABSTRACT

A system for remotely controlling one or more instruments from a control terminal. Each instrument includes a stored menu of operations it can perform under control of the terminal and an accumulator for producing an index number which selects a particular operation from the menu. The terminal includes means for transmitting commands to direct the instrument to increment the index number and to transmit back to the terminal a textual description of the currently selected menu entry. The terminal further includes means for directing the instrument to perform the operation designated by the current menu entry.

8 Claims, 3 Drawing Figures

| SAMPLE 1 | SAMPLE 2 | RATIO | SCAN | MISC |
|---|---|---|---|---|
| STATUS | STATUS | STATUS | STATUS | CHAN REVERSE |
| RANGE | RANGE | RANGE | RANGE | SELF TEST |
| LAMBDA | LAMBDA | LAMBDAS | LAMBDAS | CALIBRATE |
| ABSORBANCE | ABSORBANCE | ABSORBANCE | ABSORBANCE | SERVICE |
| AUTO RANGE | AUTO RANGE | AUTO RANGE | AUTO RANGE | |
| TIME CONSTANT | TIME CONSTANT | | BEGIN SCAN | |
| DIGITAL FILTER | DIGITAL FILTER | | PEAK ACTUATE | |

FIG. 2

INSTRUMENT CONTROL SYSTEM

BACKGROUND OF THE INVENTION

The present invention relates to systems for remotely controlling one or more instruments from a single terminal. More specifically, the invention relates to the means by which the terminal designates the operations to be performed by the controlled instruments.

In conventional systems for remotely controlling one or more instruments, the terminal has a predetermined set of command codes it can transmit to the instruments, and each command code designates a specific operation to be performed by the instrument to which it is transmitted. In such control systems, the terminal generally displays to a human user a list of the instruments connected to the terminal and descriptive names of the different operations each instrument can be commanded to perform. The user selects an instrument and an operation by depressing appropriate keys on the terminal, and the terminal generates the appropriate command code which directs the selected instrument to perform the selected operation.

One disadvantage of such conventional control systems is that the terminal often requires hardware or software modifications in order to add new instruments to the system. For example, if the control system is designed to include a group of existing or planned instruments, the system control terminal usually is built or programmed with a selection of operations including only those operations performable by the existing or planned instruments. If a new instrument having a different repertoire of operations is developed, adding the new instrument to the system requires that the terminal be modified or reprogrammed so that descriptive names of the new instrument's operations are included in the list displayed to the user and so that the terminal will generate the correct command code when the user selects an operation.

SUMMARY OF THE INVENTION

The present invention is a system for remotely controlling one or more instruments from a control terminal. According to the invention, each instrument includes a stored menu of operations it can perform under control of the terminal and an accumulator for producing an index number which selects a particular operation from the menu. The terminal includes means for transmitting commands to direct the instrument to increment the index number and to transmit back to the terminal a textual description of the currently selected menu entry. The terminal further includes means for directing the instrument to perform the operation designated by the current menu entry.

One advantage of the invention is that it facilitates adding new instruments to the control system because the terminal requires no built-in information regarding the specific operations performed by each different instrument. More specifically, the list of each instrument's repertoire of operations is stored in that instrument, eliminating the need for storing such information in the control terminal as in conventional control systems. Therefore, when a new instrument is added to the system, the instrument contains all the information required by the control terminal, thereby avoiding any need for hardware or software modifications to the terminal.

BRIEF DESCRIPTION OF THE DRAWINGS

FIG. 2 is a diagram of a command menu for a spectrophotometer included in the control system.

DESCRIPTION OF THE PREFERRED EMBODIMENT

Figure 1:
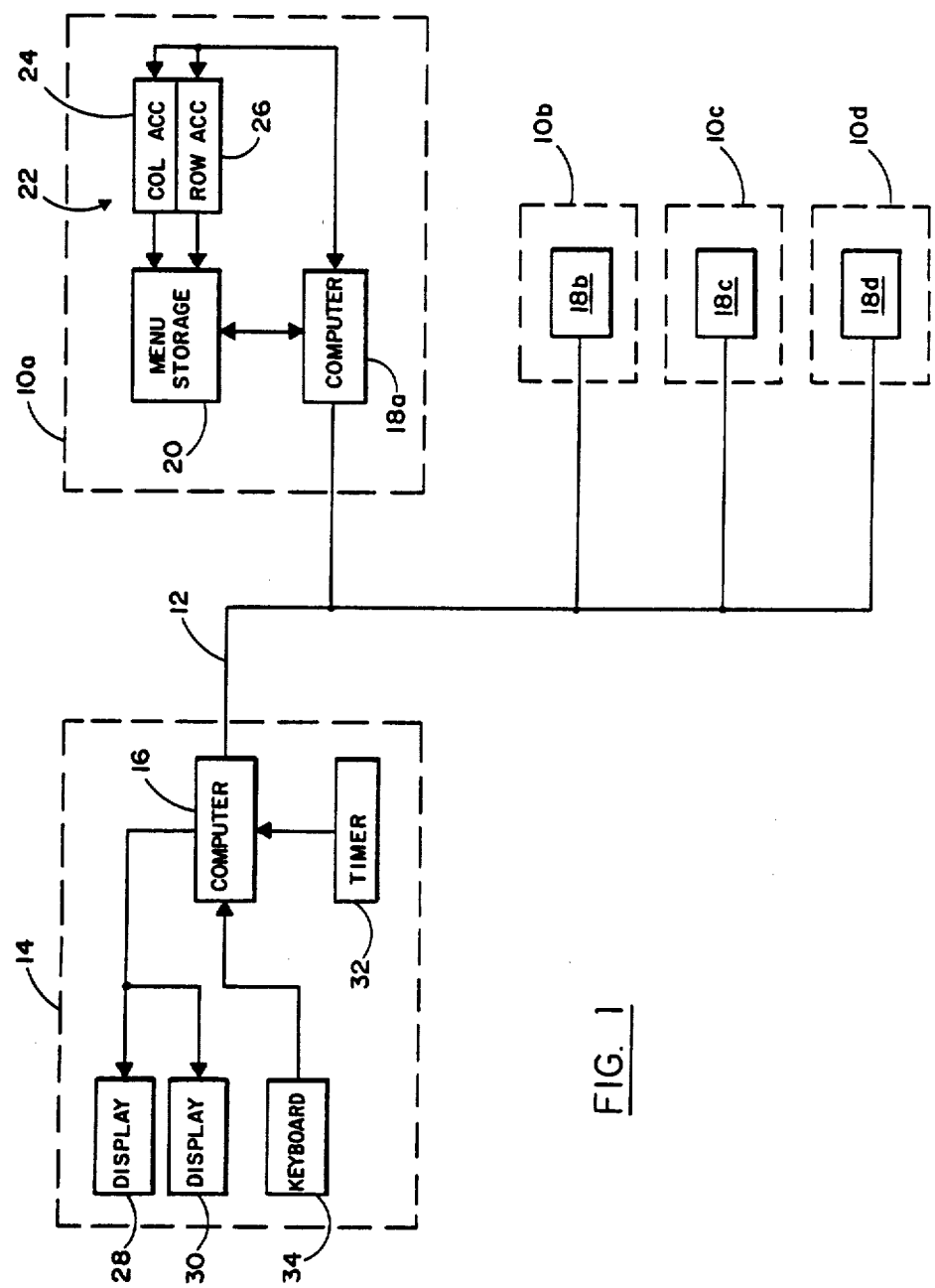
FIG. 1 is a block diagram of a control system according to the present invention.

Referring to FIG. 1, the preferred embodiment of the invention is a liquid chromatograph system including several analytical instruments 10a–d connected via a conventional electrical data bus 12 to each other and to a portable control terminal 14. Preferably, terminal 14 and each instrument 10a–d include conventional microcomputers 16 and 18a–d, respectively, programmed to perform the communications and control functions to be described below. Preferably, the computers transfer information to and from data bus 12 through conventional input-output interfaces such as UART's.

In the preferred embodiment, one of the instruments 10a controlled by terminal 14 may be a dual-beam spectrophotometer for measuring the optical absorbances of two different samples as a function of wavelength. The spectrophotometer is merely discussed as an exemplary controlled instrument, and the control system principles described below apply generally to any controlled instrument. To emphasize this, the illustrative spectrophotometer often will be referred to simply as "the instrument."

The various spectrophotometer operations that can be controlled from the terminal are summarized in the command menu shown in FIG. 2. The command menu is a table organized in five columns and seven rows. At each row/column intersection in the command menu there appears a menu "entry" which identifies either an input parameter which controls the operation of the instrument, an output parameter the instrument can measure or compute, or a procedure the instrument can perform.

The first two columns in the menu bear the headings "Sample 1" and "Sample 2," and the menu entries listed thereunder correspond to input and output parameters for measuring the first and second samples, respectively. The only output parameter is the absorbance measurement, which is the entry in row four of each column. The remaining entries correspond to input parameters. The "status" parameter turns off and on the measurement channel for each respective sample, the "range" parameter establishes the full-scale sensitivity of the absorbance measurement, the "auto range" parameter may be turned "on" to substitute an automatically determined sensitivity for the one selected by the "range" parameter, the "lambda" parameter determines the wavelength at which the absorbance is measured, the "time constant" parameter determines the time constant of a network which smoothes the absorbance measurement data, and the "digital filter" parameter may be turned "on" to activate a digital filter. Except for three procedure-type menu entries to be discussed later, the entries in columns three, four and five of the menu correspond to similar parameters.

The instrument contains a conventional data storage or memory device 20, referred to as the menu storage, in which is stored a representation of the command menu for that instrument. The menu stored in menu storage 20 is organized in rows and columns like the menu shown in FIG. 2 in that each row and column intersection in the menu of FIG. 2 corresponds to a particular location or address within menu storage 20. For each entry in the command menu shown in FIG. 2, a corresponding menu entry is stored in menu storage 20 at the address corresponding to the entry's row and column position in the menu. The following data is stored in each menu entry in storage 20: The descriptive name of that menu entry, consisting of eight alphanumeric characters; a code designating whether the menu entry represents an input parameter, an output parameter, or a procedure; if the entry is a parameter, the current numeric value of the parameter and an alphanumeric abbreviation for the scientific units in which the parameter value is expressed; and if the entry is an input parameter, the parameter's initial default value and its minimum and maximum possible values.

The instrument also contains a pointer circuit 22 for addressing and selecting a specific menu entry in menu storage 20. Pointer 22 comprises column accumulator 24 and row accumulator 26 which generate and store the column number and the row number, respectively, of the selected menu entry.

Column accumulator 24 determines the column number as a function of the cumulative number of algebraically signed "column increment" signals received by instrument 10a from terminal 14. More specifically, each "column increment" signal is encoded with a plus or minus algebraic sign. Each time terminal 14 receives a "column increment" signal, column accumulator 24 either increments or decrements the stored column number according to whether the encoded sign is plus or minus.

Column accumulator 24 may be implemented with a conventional up/down counter circuit, the up and down inputs of the counter being connected to receive a pulse each time the instrument receives a minus-signed and a plus-signed "column increment" signal, respectively. More preferably, column accumulator 24 may be implemented by programming microcomputer 18a to perform the described accumulator function.

Column accumulator 24 preferably includes circuitry or programming for preventing the column number from being decremented or incremented outside the limits of the actual number of columns in the instrument's menu. For example, if the menu has seven columns numbered from one through seven, then column accumulator 24 ignores any minus-signed "column increment" signal received when the currently stored column number equals one, and it ignores any plus-signed "column increment" signal received when the currently stored column number equals seven.

Row accumulator 26 is identical to column accumulator 24, except that the number of rows in the menu may be different from the number of columns, so that the maximum possible row number generated by row accumulator 26 may differ from the maximum possible column number discussed in the preceding paragraph.

Figure 3:
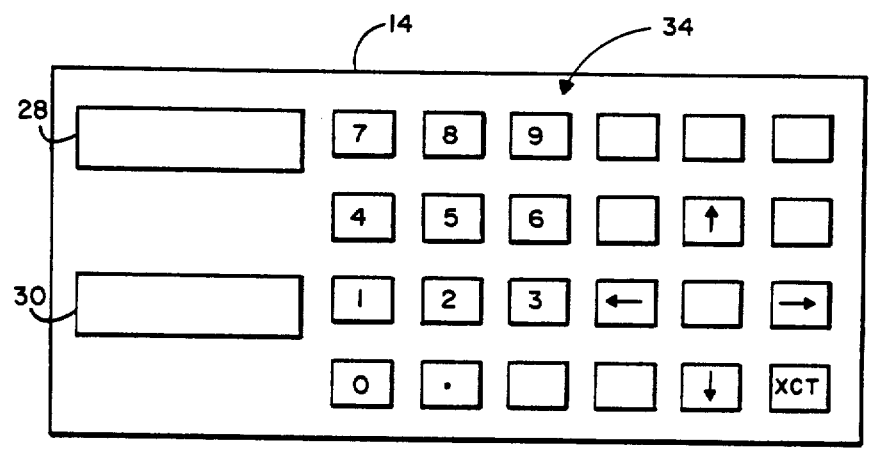
FIG. 3 is a plan view of the front panel of the control terminal of the control system.

A user can direct control terminal 14 to transmit the just-described "column increment" and "row increment" signals by use of a keyboard 34 mounted on the front panel of control terminal 14, as shown in FIG. 3. In the illustrated preferred embodiment, keyboard 34 consists of eleven numeric keys labeled with the numerals 0-9 and a decimal point, respectively, and a group of thirteen function keys labeled with symbols representing their respective control functions. The keyboard connects to microcomputer 16 which is programmed to respond appropriately to each key actuation as will be described below.

In the preferred embodiment shown in FIG. 3, four of the function keys in keyboard 34 are labeled with a right-arrow, a left-arrow, a down-arrow, and an up-arrow, respectively. When the user actuates one of these four keys, microcomputer 16 transmits to instrument 10a, via data bus 12, a plus-signed "column increment" signal, a minus-signed "column increment" signal, a plus-signed "row increment" signal, or a minus-signed "row increment" signal, respectively. In response to one of these signals, column accumulator 24 or row accumulator 26 increments or decrements the stored column number or row number as just described.

For example, if the column number and row number currently stored by column accumulator 24 and row accumulator 26 are four and five, respectively, then pointer 22 currently addresses the menu entry corresponding to column four, row five of the menu. If a user actuates the left-arrow key on keyboard 34, control terminal 14 transmits a minus-signed "column increment" signal to instrument 10a, in response to which column accumulator 24 decrements the column number from four to three. The currently selected menu entry then corresponds to column three, row five of the menu. If the user actuates the left-arrow key a second time, control terminal 14 again transmits a minus-signed "column increment" signal to instrument 10a in response to which column accumulator 24 decrements the column number to two. By repeatedly actuating the appropriate arrow keys, a user can attain any desired value for the column and row numbers. The utility of controlling pointer 22 as just described will become apparent in the subsequent discussion.

Control terminal 14 includes a display which informs the user which menu entry currently is addressed by pointer 22. Referring to FIG. 3, the front panel of control terminal 14 includes upper and lower displays 28 and 30, respectively, each of which displays one line of eight alphanumeric characters under the control of microcomputer 16. Once each second, timer 32 sends a timing signal to microcomputer 16 which triggers the microcomputer to send, via data bus 12, a command signal to instrument 10a commanding the instrument to identify the descriptive name of the menu entry currently selected by pointer 22. Upon receipt of this command signal, the instrument's microcomputer 18a retrieves the selected descriptive name from menu storage 20 and transmits it to control terminal 14 via data bus 12. The control terminal's microcomputer 16 receives the descriptive name and displays it on upper display 28.

Control terminal 14 then sends a second command signal to instrument 10a directing it to identify the current numerical value of the input or output parameter associated with the menu entry currently addressed by pointer 22. This is accomplished in the same manner as just described for the descriptive name, except that the control terminal's computer 16 displays the parameter value on the lower display 30.

By the means just described, the upper and lower displays 28 and 30 inform the terminal user of the descriptive name and the current parameter value, respectively, corresponding to the menu entry addressed by pointer 22. For example, if the column number currently stored in column accumulator 24 were two and if the row number currently stored in row accumulator 26 were three, then pointer 22 would address the menu entry in storage 20 corresponding to column two, row three of the command menu. FIG. 2 shows that the menu entry at column two, row three is the input parameter named "lambda" for Sample Two, this parameter being the wavelength (lambda) of light at which the absorbance of Sample 2 is measured by the spectrophotometer. Upper display 28 would show the descriptive name of the parameter, which may be abbreviated "LAMBDA-2,"for example. Lower display 30 would show the current value of the parameter. For example, "540 NM" appearing in the lower display would indicate that the absorbance of Sample 2 was being measured at a wavelength of 540 nanometers.

The operation of the arrow keys and displays 28 and 30, whereby a user can review the menu stored in the instrument's menu storage 20, has been described. Such review enables a user to monitor, but not control, the instrument 10a. Control operations are initiated by actuating a function key in keyboard 34 labeled "XCT," an abbreviation for "execute." Specifically, each time the user depresses the XCT key, microcomputer 16 transmits to instrument 10a an "execute" command signal directing the instrument to perform an operation associated with the menu entry currently selected by pointer 22. As stated earlier, a menu entry can represent an input parameter, an output parameter or a procedure. If the menu entry represents an input parameter, the operation performed in response to actuating the XCT key is to modify the stored value of the input parameter. If the menu entry represents an output parameter, no operation is performed in response to the XCT key, since the current value of the output parameter is displayed and updated every second as described earlier, regardless of whether the XCT key is actuated. If the menu entry represents a procedure, the operation performed may include a sequence of measurements or adjustments.

The means by which the value of a chosen input parameter may be modified is as follows. First, the user should use the arrow keys of keyboard 34, as described earlier, to manipulate pointer 22 so that it addresses the menu entry corresponding to the chosen input parameter. At this point, upper display 28 will display the descriptive name of the parameter and lower display 30 will display the parameter's current value. To modify the parameter's value, the user should type the desired new value into keyboard 34 using the numeric keys. Computer 16 is programmed to store the typed-in value and to display it in lower display 30 in place of the old parameter value. The user then should depress the XCT key, in response to which computer 16 transmits to instrument 10a both the "execute" signal just discussed and signals representing the typed-in value. Upon receipt of these signals, computer 18a is programmed to store the typed-in value in menu storage 20 in place of the selected input parameter's previously stored value.

The four arrow keys described earlier can be used in conjunction with the XCT key to inspect and modify each of the parameters in the menu of instrument 10a. For example, suppose that the "lambda" parameter for Sample Two has just been set to a value of 560 nanometers by the procedure just described so that upper display 28 and lower display 30 display "LAMBDA-2" and "560 NM,"respectively. To inspect the current value of the "lambda" parameter for Sample One, the user should depress the left-arrow key, thereby causing the column number to decrement from two to one. Upper display 28 will then change to "LAMBDA-1" and lower display 30 will display the current value of the "lambda" parameter for Sample One. To modify this parameter, the user should type the desired value on keyboard 34 and then depress the XCT key. Otherwise, the parameter's value will remain unchanged.

By depressing an arrow key again, the user can now inspect and modify another parameter. For example, if the user depresses the down-arrow key, the row number will be incremented to four and the "absorbance" measurement for Sample One, an output parameter, will be displayed. Upper display 28 will change to "ABSORB-1" and lower display 30 will display the measured absorbance. Instrument 10a preferably measures all output parameters continuously, rather than waiting for an "execute" command to begin collecting measurement data. Accordingly, microcomputer 18a is programmed to ignore any received "execute" signals whenever the currently selected menu entry corresponds to an output parameter.

The spectrophotometer menu shown in FIG. 2 includes three menu entries that are procedures rather than input or output parameters, namely, "begin scan," "self test" and "calibrate." For each menu entry of the procedure type, menu storage 20 includes a stored program instructing computer 18a to perform, in response to a received "execute" signal, a sequence of operations which constitutes that procedure. To command instrument 10a to perform one of these procedures, a user should actuate appropriate arrow keys until the selected menu entry addressed by pointer 22, as indicated by upper display 28, is the desired procedure. The user should then depress the XCT key, causing computer 16 to transmit an "execute" signal to instrument 10a. Upon receiving the "execute" signal, computer 18a executes the procedure.

Continuing the preceding example, if the user currently were observing the value of the absorbance measurement for Sample One, pointer 22 would be addressing column one and row four. To command instrument 10a to perform the "begin scan" procedure, the user could depress the down-arrow key twice to increment the row number to six. If the user then depressed the XCT key, control terminal 14 would transmit an "execute" signal to instrument 10a, which would then perform the procedure designated in the currently selected menu entry, namely, the "begin scan" procedure.

The foregoing description has been limited to the control of a single instrument 10a. In the preferred embodiment of the invention, several additional instruments 10b–d may be controlled by the same control terminal 14 by wiring each of the instruments to data bus 12. By any of various conventional means, the previously described signals transmitted by control terminal 14 may be encoded so as to be directed to a single selected instrument.

In the preferred embodiment, each instrument 10a–d includes a switch for selecting a unique code number for that treatment within the range one through eight. When the control terminal transmits to the instruments, via data bus 12, a "wakeup" signal encoded with a particular instrument code number, the instrument having that code number receives and responds to all signals subsequently transmitted by the control terminal. The other instruments ignore all subsequent signals on the data bus 12 until control terminal 14 transmits another "wakeup" signal.

In the preferred embodiment, each of the various signals described above is an 8-bit binary digital signal. Each different signal—such as the four types of "increment" signals, the "execute" signal, and the signals encoded with typed-in numeric values—is distinguished by a unique 8-bit binary value. However, other conventional means for encoding distinct signals for transmission over a conventional data bus may be substituted.

The menu entries in menu storage 20 have been described as being organized into rows and columns, the row and column addresses of a currently selected menu entry being determined by row and column accumulators 26 and 24, respectively. Menu storage 20 may be said to be organized in two dimensions, the two dimensions being the row number and the column number. In applications in which an instrument's menu is to have only a small number of entries, a one-dimensional menu may be preferable. In such case, each menu entry would be identified by a single index number generated and stored by a single accumulator circuit. Only two arrow keys, and two corresponding types of "increment" signals, would be required to command the accumulator to increment and decrement the index number. An even more elementary alternative would be to provide only one arrow key for transmitting only a single type of "increment" signal, and to design the accumulator as a unidirectional counter which "rolls over" each time in "increment" signal is received after the index number has attained a predetermined maximum value. Conversely, menu storage 20 could be organized in three or more dimensions, with the number of accumulators equalling the number of dimensions.

The foregoing description illustrates how a user of control terminal 14 can inspect the entire menu of instrument 10a, modify any input parameters, and command the instrument to perform procedures. Since the instrument's command repertoire is recorded solely in menu storage 20, not in control terminal 14, any other instrument designed according to the present invention could be substituted for the illustrated spectrophotometer 10a without modifying or reprogramming the control terminal.

We claim:

1. Apparatus for controlling an instrument to perform one or more predetermined operations, comprising:
   an instrument having means for receiving an "increment" signal and an "execute" signal; means for accumulating the number of "increment" signals that are received by the instrument and storing an index number representing the result of the accumulation; memory means for storing data for the one or more predetermined operations, the data for each such operation including an identifier representing the descriptive name of the respective operation; means for selecting, from the stored data, selected data relating to a specified one of the one or more predetermined operations as a function of the current value of the index number; means for transmitting an identification signal encoded to represent alphanumeric characters determined by the identifier included in the currently selected data; and means for performing the operation related to the selected data each time the instrument receives the "execute" signal; and
   a control terminal having transmitting means for selectably producing and transmitting the "increment" signal and the "execute" signal, means for receiving the identification signal, and means for displaying the encoded alphanumeric characters.

2. Apparatus according to claim 1, wherein:
   the transmitting means in the control terminal further includes means for encoding each transmitted "increment" signal with an algebraic sign; and
   the accumulator means in the instrument further includes means for algebraically accumulating the signed "increment" signals.

3. Apparatus according to claim 2 wherein:
   the control terminal further includes means for selectably transmitting a second "increment" signal encoded with an algebraic sign;
   the instrument further includes means for algebraically accumulating the number of received second "increment" signals and storing a second index number representing the result of the accumulation; and
   the selection means in the instrument includes means for selecting the selected data relating to a specified one of the one or more predetermined operations as a function of the first mentioned index number and second index number.

4. Apparatus according to claim 3 wherein the control terminal further includes first, second, third, fourth and fifth manually actuated switches, means for transmitting the first named "increment" signal encoded with a plus sign and a minus sign, respectively, each time the first and second switches are actuated, respectively, means for transmitting the second "increment" signal encoded with a plus sign and a minus sign, respectively, each time the third and fourth switches are actuated, respectively, and means for transmitting the "execute" signal each time the fifth switch is actuated.

5. Apparatus according to claim 1 or 4, wherein:
   the control terminal further includes keyboard means for manually entering a numerical value and means for transmitting, each time the "execute" signal is transmitted, a "value" signal encoded to represent the numerical value;
   the displaying means further includes means for displaying the entered numerical value; and
   the instrument further includes means for receiving the "value" signal, means for decoding the numerical value, and means for storing the decoded numerical value into the memory means as a portion of the selected data such that the decoded numerical value is for use in performing the operation related to the currently selected data.

6. Apparatus for controlling a plurality of instruments to perform one or more predetermined operations, wherein:
   each instrument comprises means for receiving an "increment" signal and an "execute" signal; means for accumulating the number of "increment" signals that are received by the instrument and storing an index number representing the result of said accumulation; memory means for storing data for the one or more predetermined operations, the data for each such operation including an identifier representing the descriptive name of the respective operation; means for selecting from the stored data the data relating to a specified one of the one or more predetermined operations as a function of the current value of the index number; means for transmitting an identification signal encoded to represent alphanumeric characters determined by the identifier included in the currently selected data; and means for performing the operation related to the selected data each time the instrument receives an "execute" signal; and the apparatus further comprises a control terminal having means for selectably producing and transmitting to a selected instrument the "increment" signal and the "execute" signal, means for receiving the identification signal, and means for displaying the encoded alphanumeric characters.

7. Apparatus according to claim 5 wherein:

the memory means further includes means for storing an output numerical value into the memory means as a portion of the selected data, the output numerical value representing a result obtained by the operation related to the selected data; and means for transmitting an output numerical value signal encoded to represent alphanumeric characters determined by the output numerical value included in the currently selected data; and the control terminal includes means for receiving the output numerical value signal and the display means further includes means for displaying the encoded alphanumeric characters.

8. Apparatus for controlling at least one instrument to perform one or more predetermined operations, comprising:

each at least one instrument having means for receiving an "increment" signal and an "execute" signal; means for accumulating the number of "increment" signals that are received by the instrument and storing an index number representing the result of the accumulation; memory means for storing data for the one or more predetermined operations, the data for each such operation including an identifier representing the descriptive name of the respective operation; means for selecting, from the stored data, selected data relating to a specified one of the one or more predetermined operations as a function of the current value of the index number; means for receiving an input numerical value signal; means for decoding the input numerical value signal and for storing the decoded input numerical value signal into the memory means as a portion of the selected data such that the decoded input numerical value is stored for performing the operation related to the currently selected data; means for storing an output numerical value into the memory means as a portion of the selected data, the output numerical value representing a result obtained by the operation related to the selected data; means for transmitting an output numerical value signal encoded to represent alphanumeric characters determined by the output numerical value included in the currently selected data; means for transmitting an identification signal encoded to represent alphanumeric characters determined by the identifier included in the selected data; and means for performing the operation related to the selected data each time the instrument receives an "execute" signal; and a control terminal having transmitting means for selectively producing and transmitting to a selected one of the at least one instrument the "increment" signal and the "execute" signal; means for receiving the identification signal; means for receiving the output numerical value signal; means for displaying the encoded alphanumeric characters representing the output numerical value and the identifier; keyboard means for manually entering an input numerical value, the display means further including means for displaying the input numerical value; and means for transmitting the input numerical value signal encoded to represent the input numerical value.

* * * * *